United States Patent
Kempf et al.

(10) Patent No.: US 11,845,531 B2
(45) Date of Patent: Dec. 19, 2023

(54) FIREPROOF AND THERMAL INSULATOR PRODUCT

(71) Applicant: AIRBUS OPERATIONS S.L., Madrid (ES)

(72) Inventors: Manuel Kempf, Getafe (ES); Asuncion Butragueno-Martinez, Getafe (ES); Jorge Ballestero Méndez, Getafe (ES); Fernando Iniesta Lozano, Getafe (ES); Guillermo Hernaiz Lopez, Getafe (ES); Pablo Vazquez Sanchez, Getafe (ES); Alberto Arana Hidalgo, Madrid (ES); Jesus Javier Vazquez Castro, Getafe (ES)

(73) Assignee: AIRBUS OPERATIONS S.L., Madrid (ES)

( * ) Notice: Subject to any disclaimer, the term of this patent is extended or adjusted under 35 U.S.C. 154(b) by 423 days.

(21) Appl. No.: 17/098,772

(22) Filed: Nov. 16, 2020

(65) Prior Publication Data
US 2021/0147062 A1 May 20, 2021

(30) Foreign Application Priority Data
Nov. 14, 2019 (EP) .................... 19383000

(51) Int. Cl.
*B64C 1/40* (2006.01)
*H01M 50/116* (2021.01)
(Continued)

(52) U.S. Cl.
CPC .................. *B64C 1/40* (2013.01); *B32B 7/08* (2013.01); *B32B 7/12* (2013.01); *B32B 9/005* (2013.01);
(Continued)

(58) Field of Classification Search
CPC ............ B64C 1/40; B64C 2001/0054; H01M 50/116; H01M 2220/20; B32B 7/08;
(Continued)

(56) References Cited

U.S. PATENT DOCUMENTS

| | | | | |
|---|---|---|---|---|
| 1,183,694 | A * | 5/1916 | Balthasar ................. | D04B 1/14 428/921 |
| 3,013,906 | A * | 12/1961 | Flowers .................... | C08J 7/12 525/440.15 |
| 2019/0207188 | A1 | 7/2019 | Miller et al. | |

FOREIGN PATENT DOCUMENTS

| | | |
|---|---|---|
| CN | 103422641 | 5/2016 |
| EP | 3 636 427 | 4/2020 |

(Continued)

OTHER PUBLICATIONS

European Search Report cited in EP 19383000 dated Apr. 29, 2020, 8 pages.

*Primary Examiner* — Alicia J Weydemeyer
*Assistant Examiner* — Laura B Figg
(74) *Attorney, Agent, or Firm* — Nixon & Vanderhye P.C.

(57) ABSTRACT

A fireproof and thermal insulator product (1) including an Alkaline Earth Silicate (AES) material (2), and at least one of the following: a liquid barrier film (5), an FRP (Fiber Reinforcement Plastic) layer (4), cork (3), wherein the liquid barrier film (5) and the FRP layer (4) are staked onto the AES material (2), and wherein the cork (3) material is also staked onto the AES material (2) or embedded into said AES material (2) in where said cork (3) is configured as a plurality of strips performing a grid structure infilled with the AES material (2).

18 Claims, 6 Drawing Sheets

(51) Int. Cl.
  *B32B 7/08* (2019.01)
  *B32B 7/12* (2006.01)
  *B32B 9/00* (2006.01)
  *B32B 9/02* (2006.01)
  *B32B 9/04* (2006.01)
  *B32B 27/12* (2006.01)
  *B32B 27/28* (2006.01)
  *B32B 27/30* (2006.01)
  *B32B 27/36* (2006.01)
  *B64C 1/00* (2006.01)

(52) U.S. Cl.
  CPC ............... *B32B 9/02* (2013.01); *B32B 9/045* (2013.01); *B32B 9/047* (2013.01); *B32B 27/12* (2013.01); *B32B 27/285* (2013.01); *B32B 27/304* (2013.01); *B32B 27/36* (2013.01); *H01M 50/116* (2021.01); *B32B 2262/101* (2013.01); *B32B 2262/106* (2013.01); *B32B 2307/304* (2013.01); *B32B 2307/3065* (2013.01); *B32B 2307/7265* (2013.01); *B32B 2457/10* (2013.01); *B32B 2605/18* (2013.01); *B64C 2001/0054* (2013.01); *H01M 2220/20* (2013.01)

(58) Field of Classification Search
  CPC .. B32B 7/12; B32B 9/005; B32B 9/02; B32B 9/045; B32B 9/047; B32B 27/12; B32B 27/285; B32B 27/304; B32B 27/36; B32B 2262/101; B32B 2262/106; B32B 2307/304; B32B 2307/3065; B32B 2307/7265; B32B 2457/10; B32B 2605/18
  See application file for complete search history.

(56) References Cited

FOREIGN PATENT DOCUMENTS

| | | | |
|---|---|---|---|
| GB | 2568688 | 5/2019 | |
| GB | 2568688 A | * 5/2019 | ............ B32B 15/20 |
| JP | 11-198264 | 7/1999 | |
| WO | 2013/120148 | 8/2013 | |

* cited by examiner

FIREPROOF AND THERMAL INSULATOR PRODUCT

RELATED APPLICATION

This application claims priority to European Patent Application 19383000-7, filed Nov. 14, 2019, the entirety of which is incorporated by reference.

TECHNICAL FIELD

The invention refers structures and associated systems with protection against the consequences of a fire event, particularly flame penetration, and that also provide thermal insulation capability. The invention is particularly applicable in different parts of aircrafts, such as fixed wing airplanes and helicopters.

BACKGROUND

Many parts of the aircraft are at risk during a fire event. To ensure normal operation of the aircraft, the structure and associated systems should be protected against the fire event consequences. For these purposes, several materials and solutions have been tested and installed to prevent the consequences of the fire events. Two main effects need to be solved depending on the application: flame penetration and thermal insulation.

The flame penetration issue is typically addressed by keeping the fire enclosed in the designated area. The thermal insulation capability may allow the use of a wide range of materials for the structural applications having less decoupling temperature requirements.

A widely used state of the art solution are the thermal blankets, mainly made of ceramic or silicone laminates with aluminum sheet. Thermal blanket insulations are effective suppression of flame penetration and provide thermal insulation, but are expensive and heavy. Thermal blanket insulations lack of rigidity and thus can collapse during the manufacturing or assembly process. If the blankets remain collapsed in the aircraft, the blankets loss much of their ability to suppress flame penetration and provide thermal insulation to the regions of the aircraft intended to be covered by a properly deployed blanket.

Another state of the art solution is based on materials which work against a fire event by creating a porous charred layer of material, preventing the flame penetration and providing insulation. This option is relevant in many applications due to its performance, however structures submitted to vibrations cannot implement this solution due to the loss of protection under the operation conditions.

In a further state of the art solution, materials like titanium, steel or Inconel that exhibit higher fire-resistant/fireproof capability are added or used instead of conventional materials usually used for structural parts such as aluminum, and conventional composite materials, such as carbon reinforced plastics (CFRP) and glass fiber reinforced plastics (GFRP). Titanium, steel and Inconel suppress fire penetration better than aluminum and conventional composite materials.

As an example the auxiliary power unit (APU) in an aircraft may be surrounded by a titanium firewall to shield from fire aluminum structures on the other side of the firewall from the APU and to prevent a fire reaching a tail cone of an aircraft.

SUMMARY OF INVENTION

A fireproof and thermal insulation laminate has been invented and is disclosed herein that may be embodied to provide a product that is fireproof and has also good thermal insulation capability, to avoid having aircraft structures surrounding fire source reaching high temperatures that could damage the structure.

The fireproof and thermal insulation laminate may be embodied to provide a fireproof and thermal insulator product comprising a material combination of: alkaline Earth Silicate (AES) material, and at least one of the following: a liquid barrier film, an FRP (Fiber Reinforcement Plastic) layer and cork, wherein the liquid barrier film and the FRP layer are staked to the AES material, and the cork material is staked to the AES material or embedded into the AES material. If the cork is embedded in the AES material, the cork is configured as strips that may form a grid structure with the AES material between the cork strips.

The invention may be embodied as: a fireproof and thermal insulator product comprising: alkaline earth silicate (AES) material; a liquid barrier film; a fiber reinforcement plastic (FRP) layer; cork, wherein the liquid barrier film and the FRP layer are staked on the AES material, and wherein the cork is stacked as a cork layer on the AES material and/or the cork includes strips of cork embedded into the AES.

The fireproof and thermal insulation laminate may be embodied to provide one or more of the following advantages: low cost; light weight; good fire-proof and thermal insulation capabilities; environmentally friendly; and able to be integrated with structural panels, ducts, casing and other structures such as in an aircraft. Moreover the fireproof and thermal insulation laminate may be embodied to have more rigidity than conventional thermal blankets and thus are less susceptible to collapsing during the manufacturing and/or assembly process. Further, the fireproof and thermal insulation laminate provides good thermal insulation and thus may be used to allow the use in fire-zone designated areas of an aircraft of structural materials having limited high-temperature strength capability.

Other characteristics and advantages of the present invention will be clear from the following detailed description of several embodiments illustrative of its object in relation to the attached figures.

SUMMARY OF DRAWINGS

FIG. 4a shows a top view. FIG. 4b shows a cross-sectional view of the fireproof and thermal insulator product according to a third embodiment of the invention. FIG. 4c shows a cross-sectional view of the fireproof and thermal insulator product according to a fourth embodiment of the invention.

FIG. 5b shows a detailed view of the APU compartment shown in FIG. 5a.

DETAILED DESCRIPTION

The term "fireproof" is defined by aeronautical regulations such as: FAR/JAR 25.1191: Firewalls-Definition, AND FAR/JAR 25.865: Fire Protection Of Flight Controls, Engine Mounts And Other Flight Structures.

Figure 1:
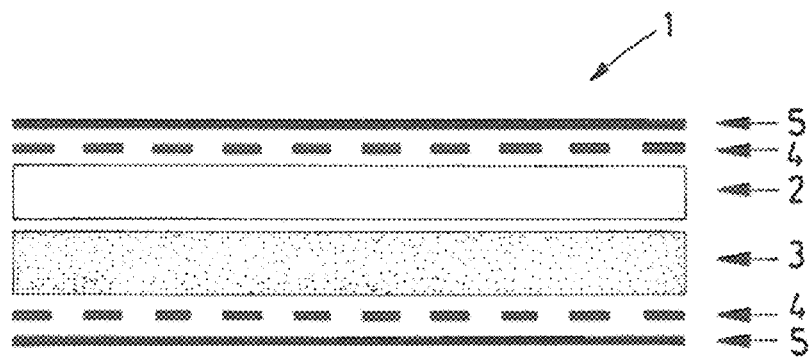
FIG. 1 is a diagram schematically showing a cross section of a fireproof and thermal insulator panel, according to a first embodiment of the invention.

FIG. 1 shows a first configuration of the fireproof and thermal insulator product 1 of the invention that comprises a stack of layers including a layer of cork 3, and a layer of Earth Silicate material (AES) 2 at the side of the product 1 intended to face the fire. The layer of AES 2 mainly acts as a fireproof barrier, and in a second level as thermal insulator, while layer of cork 3 acts as thermal insulator. The AES layer 2 may be bonded to the cork layer 3 by an adhesive layer or film or by fasteners, such as screws, bolts or clamps.

The AES and cork layers 2, 3 may be covered by a barrier film(s) 5 that protects the layers 2, 3 from liquids. The barrier films 5 may be a fiber reinforcement plastic (FRP) film 4 that covers an exposed side of the AES layer and another filmy 4 covers an exposed side of the cork layer. The pair of films or layers of FRP 4 perform adhere the AES and the cork. The cork may be Preferably, the liquid barrier film 5 is a poly-vinyl fluoride (PVF) film or similar thermoplastic materials, such as polyether ether ketone (PEEK), polyvinylidene fluoride (PDVF) and polyethylene terephthalate (PET). The FRP layer 4 may be a glass fiber reinforced plastic (GFRP) layer.

The product 1 shown in FIG. 1 is a good solution for non-structural protections that could be placed in many areas as add-ons over a structure in protect it from fire and temperature. The product 1 may be applied as a layer or panel to a structure in an aircraft, such as to a firewall, interior or exterior surface of a duct, and as panels for casings, such as a battery casing.

Figure 2:
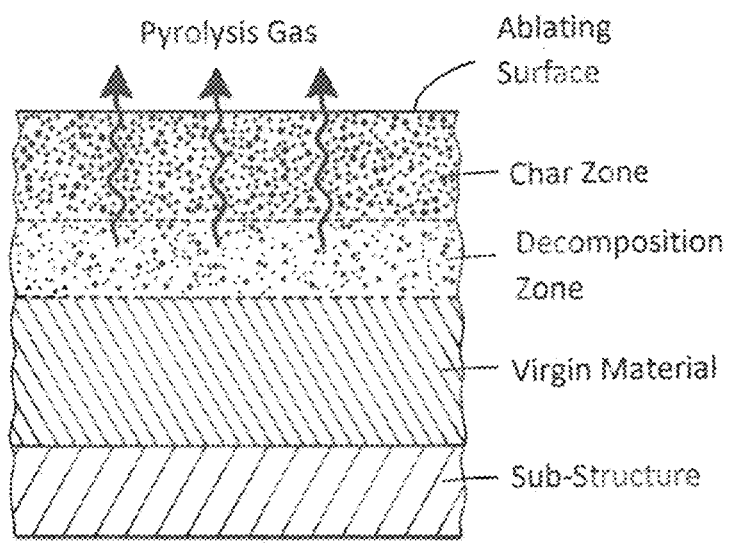
FIG. 2 is side view of a cross section of a cork layer illustrates the thermal behavior of the cork.

In addition to the thermal insulation and low heat conductivity of cork, cork exhibits other important characteristics for this specific application. As shown in FIG. 2, the closed cell (micro)structure of cork acts as effective barrier against hot fire gases and its degradation under severe heat impact produces a further thermally insulating char layer on the surface directed towards the fire and heat source. Pyrolysis gases are considered to provide some insulating effects as well.

As shown in FIG. 2, a layer of cork is applied to a sub-structure, such as a structural panel in an aircraft. The cork (virgin material) when exposed to fire decomposes in a direction from the surface of the cork exposed to the fire towards the opposite side of the cork layer. As the cork is degraded (decomposition zone) by fire, the cork generates pyrolysis gases which oppose the fire. Once degraded by fire, the cork forms a char zone which continues to provide thermal insulation and fire protection. The char zone and decomposition zone slow the propagation of fire and heat through the remaining virgin cork layer and to the sub-structure.

Figure 3:
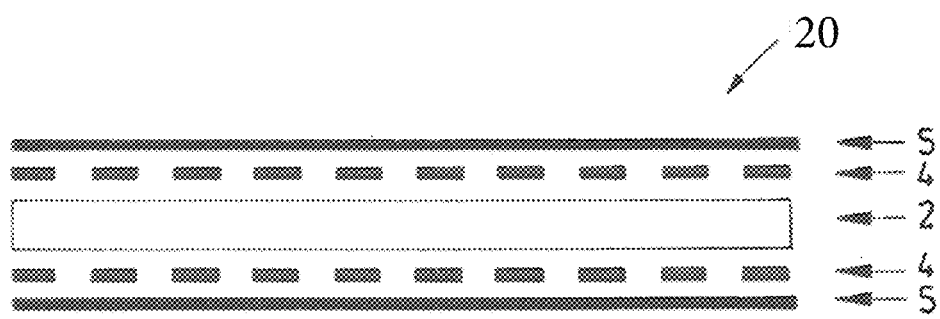
FIG. 3 is a diagram schematically showing a cross section of a fireproof and thermal insulator panel, according to a second embodiment of the invention.

FIG. 3 shows a second configuration of the fireproof and thermal insulator product 20 of the invention that comprises a stack of layers including a layer of Earth Silicate material (AES) 2, a pair of layers of FRP (Fiber Reinforcement Plastic) 4 at both sides of the AES 2, and a pair of liquid barrier films 5 at both sides of the FRP layers 4. In this second configuration, the layer (or several layers) of AES acts as fireproof barrier and thermal insulation solution. Cork strips may be embedded in the AES layer 2. Similar to the embodiment of FIG. 1, this second configuration 20 is suitable for non-structural protections that could be placed in many areas as add-ons over the structure to protect it from fire and temperature.

Figure 4A:
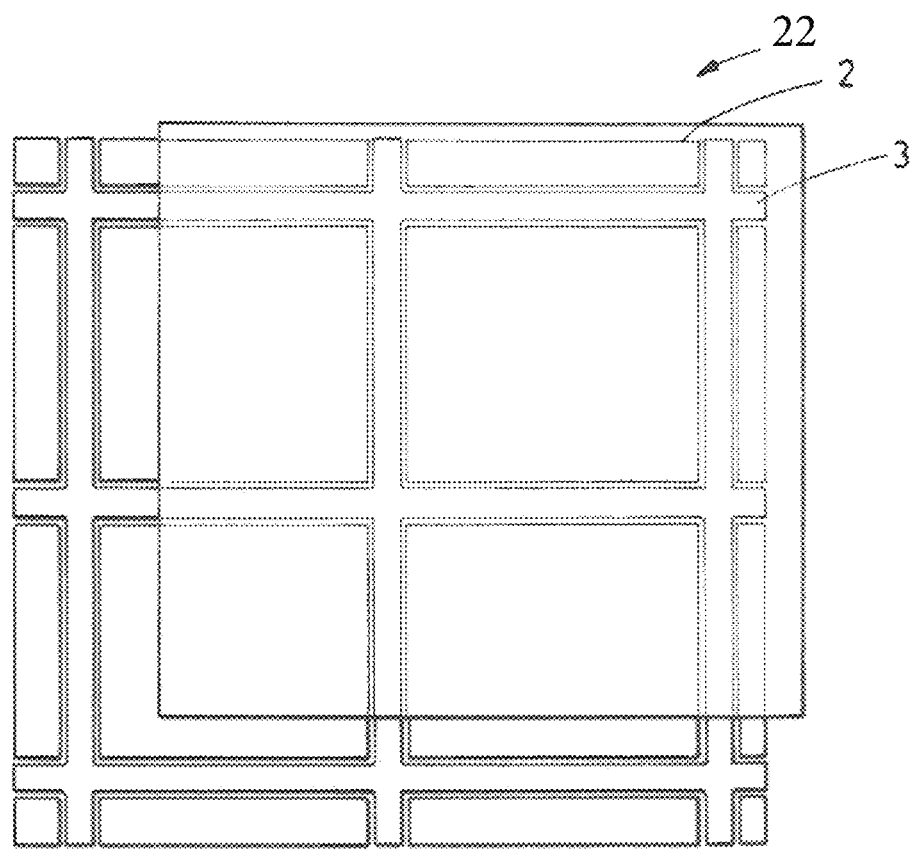
FIGS. 4a to 4c show schematic views of a fireproof and thermal insulator product, according to another embodiment of the invention.
Figure 4B:
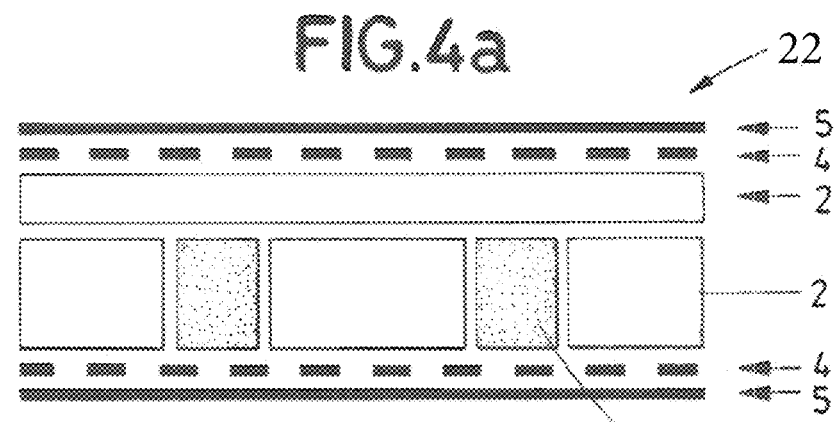
Figure 4C:
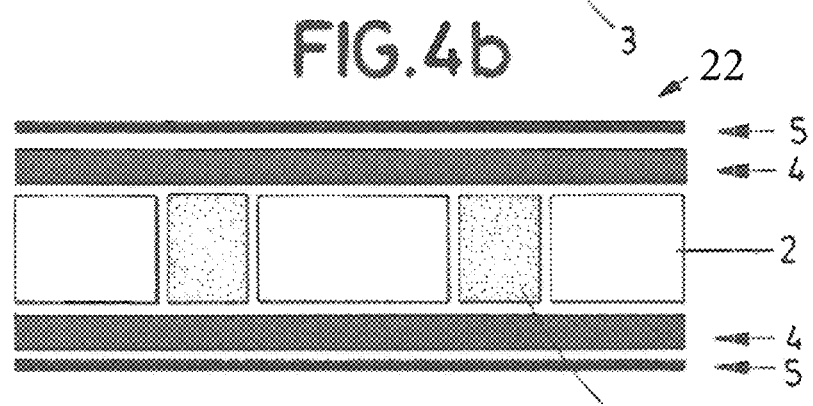

FIGS. 4a to 4c show other embodiments of the fireproof and thermal insulator product 22. In these embodiments, the product 22 comprises a stack of layers including a layer formed by AES 2 and cork 3. The cork 3 is configured as strips arranged in a grid structure (lattice) which provides structural support for the product 22. The AES material 2 is in the open regions of the grid, such that the cork strips are embedded in the AES material. This is schematically shown in FIGS. 4a, 4b and 4c.

The grid of cork strips embedded in AES and sandwiched between the FRP layers forms a laminate that is substantially rigid and capable of providing some structural support, such as for the panels of a battery casing or for a firewall. The product 22 may be deployed as panels or layers covering a structure in an aircraft or as a layer within a structure of the aircraft, such as inside panels in a duct or as an internal layer sandwiched between structural layers. Additionally, in this case, the cork is acting as a rigid structure preventing collapse of the insulator material during the curing in the autoclave due to the high pressure exerted.

FIG. 4b shows a third embodiment in which the layer formed by a lattice of cork 3 infilled with AES 2 further comprises an additional layer of AES 2 deposited onto the layer consisting of AES+cork, a pair of layers of FRP (fiber Reinforcement Plastic) 4 at both sides of the layer of AES+cork and the additional layer of AES 2, and a pair of liquid barrier films 5 at both sides of the FRP layers 4. In this third configuration, the layer or several layers of AES acts as fireproof barrier and thermal insulation solution. The FRP layer 4 may be a GFRP layer.

FIG. 4c shows a fourth embodiment in which the layer formed by a lattice of cork 3 infilled with AES 2 further comprises a pair of layers of FRP (Fiber Reinforcement Plastic) 4 at both sides of the layer consisting of AES+cork, and a pair of liquid barrier films 5 at both sides of the FRP layers 4. In this fourth configuration, the FRP layer acts as fireproof barrier and thermal insulation solution. This fourth embodiment is very promising for the direct integration as part of a composite structure. The FRP layer 4 may be a CFRP layer.

The first embodiment (FIG. 1) has been tested by means of a bunsen trial. The testing sample had a 2 mm layer of AES 2 and an 8 mm layer of cork 3, and following conditions were applied: direct flame impingement for 15 min; Calibrated Flame of 1100° C.; no load or vibration applied, and protection against fluids of GFRP and PVF covering both layers.

The result after the 15 minutes required with the 1100° C. flame, was that, not only there is NO pass through of the flame, but also the temperature measured at the rear part of the specimen was 220° C.

The third embodiment (FIG. 4b) has been tested fulfilling the FAR/JAR 25 regulations regarding firewalls, FAR/JAR25.1191 & FAR/JAR25.865, that is: direct flame impingement for 15 min; calibrated Flame of 1100° C. at a distance of 100 mm from the specimen; calibrated Heat Flux; specimen under vibration of 50 Hz (reduced to 16.6 Hz after 5 min.); no load applied, and protection against fluids of GFRP and PVF covering the infilled core.

The result after the 15 minutes required with the 1100° C. flame, was that, not only there is NO pass through of the flame, but also the temperature measured at the rear part of the specimen was 240° C. with peaks around 300° C. on fastener hot spots.

According to another aspect, the invention also refers to a composite part (non-structural part) that comprises the fireproof and thermal insulator product as the ones shown in the first or in the second embodiments. In these cases, the product is attached to the part by means of fasteners, by a bonding, or by a Velcro type junction. In case that the attachment is by means of fasteners, washers may be used on the fasteners and between the head of the fastener and the outer surface of a fireproof and thermal insulator laminate panel. The fasteners and the washers may be used to create an air gap between the fireproof and thermal insulator laminate panel and the structural component to which the fasteners are attached and is being thermally shielded by the laminate panel. The air gap provides another layer of thermal insulation for the structural component.

According to another embodiment of the invention, the composite part (structural part) comprises the fireproof and thermal insulator product, as the ones shown in the third or in the fourth embodiments. In these cases, the product 1, 20 and 22 is bonded or co-cured to the part.

The proposed invention may be embodied in various parts of an aircraft, such as a firewall for an APU, tail cone or other portion of the aircraft; a battery casing; and in an engine support platform.

A firewall at the rear end of an aircraft, such as at a compartment for an auxiliary power unit (APU), may embody the invention. The invention could be formed as a firewall to be used in place of a conventional titanium firewall. by a new protection based in the proposed solutions, preferably first or second embodiments; benefits: Safety improvement, RC reduction, In case of fire, neither flame nor heat will affect the structure of the rear end of the aircraft, so there will be no need to replace it after fire event.

Figure 5A:
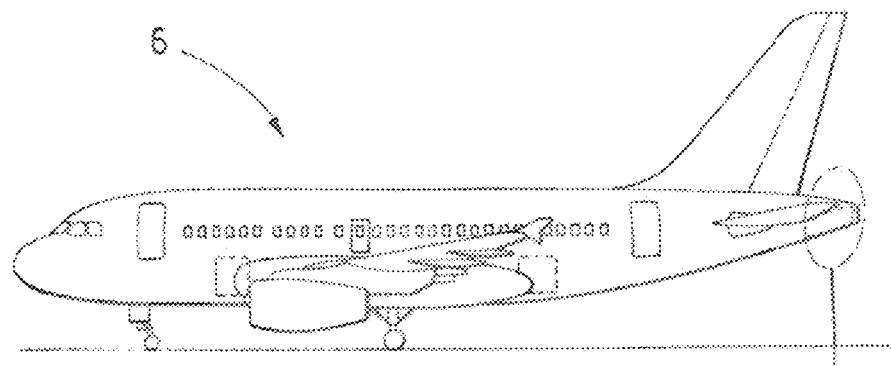
FIG. 5a shows an aircraft having an APU compartment at the rear of the fuselage, in which compartment is at least one firewall that includes a fireproof and thermal insulator product embodying the invention.
Figure 5B:
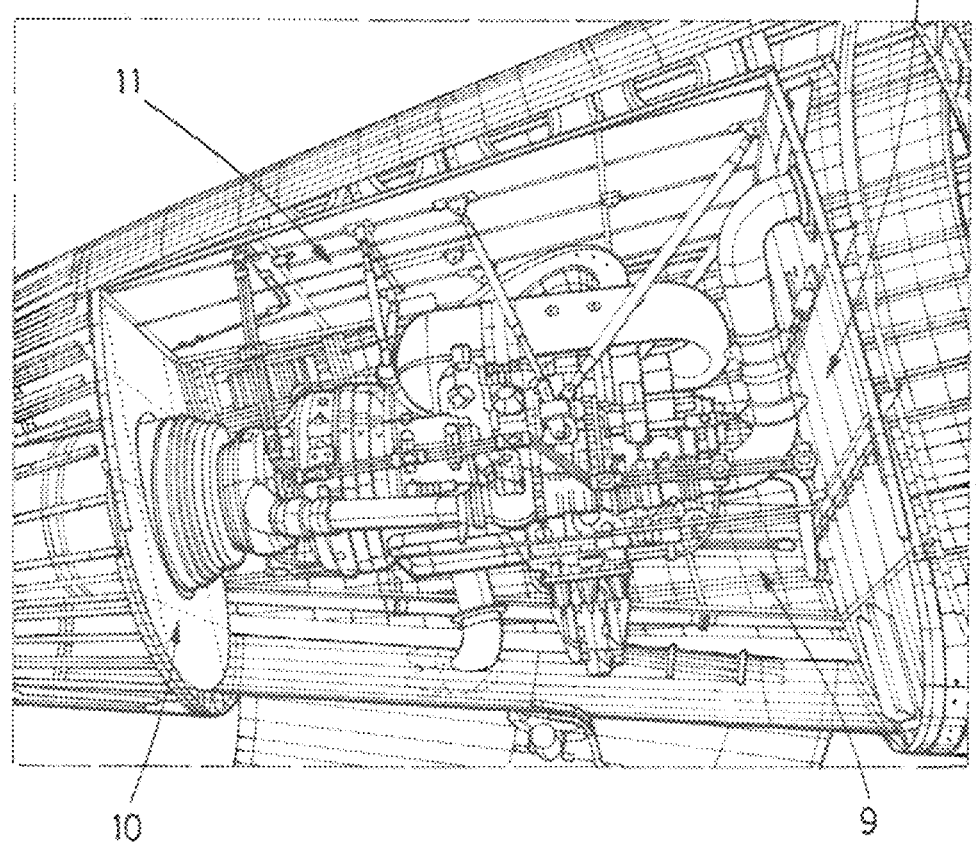

According to another aspect, the invention also refers to a rear end of an aircraft 6, comprising an APU compartment 7 insulated by at least one firewall 8, 9, 10, 11 that comprises the fireproof and thermal insulator product 1, 20 and 22. FIG. 5*a* shows an aircraft 6 having an APU compartment 7 on its rear end. FIG. 5*b* shows a detailed view of the APU compartment 7 and most of its walls: the front firewall 8, the lateral firewall 9, the rear firewall 10, and the upper firewall 11, in where at least one of its walls includes the fireproof and thermal insulator product 1, 20 and 22.

Front firewall of the rear end of an aircraft: Sizing constraint: fire-proof and Thermal protection; modification: Replace current Titanium firewall and aluminum stringers by a new protection based in the proposed solutions, preferably third or fourth embodiments, and benefits: Safety improvement, RC reduction, In case of fire, neither flame nor heat will affect the structure of the firewall, so there will be no need to replace it after fire event.

Figure 6A:
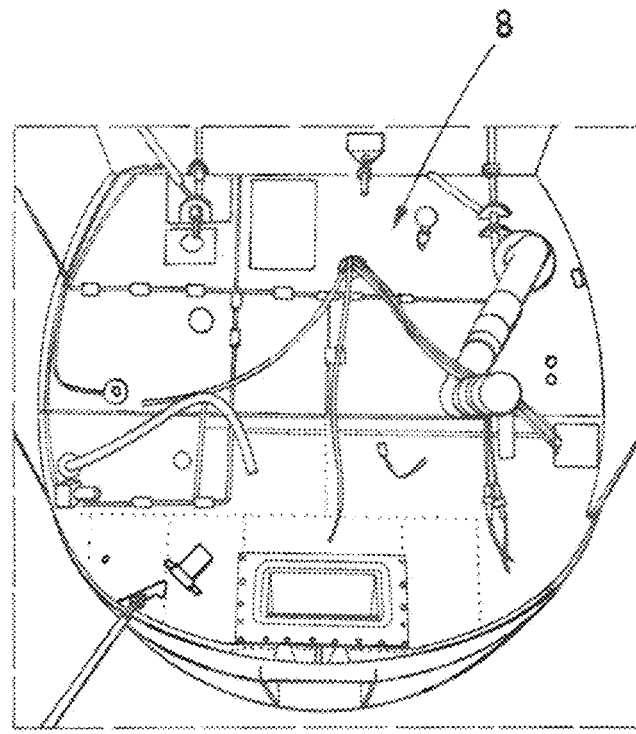
FIGS. 6a and 6b each show a front firewall of an APU compartment.
Figure 6B:
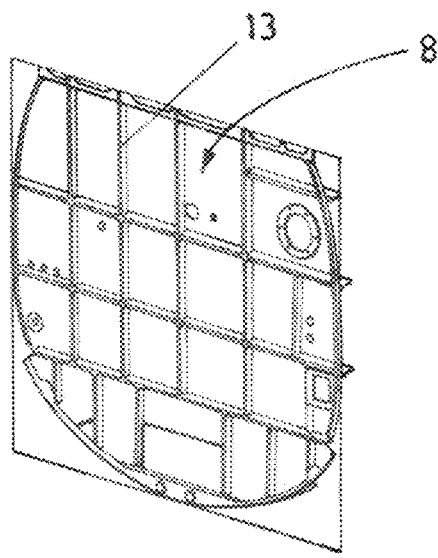

According to another aspect, the invention may be embodied as a front firewall 8 that comprises the fireproof and thermal insulator product 1, 20 and 22. FIGS. 6*a* and 6*b* show a front firewall 8 of an APU compartment. FIG. 6*b* shows the stringers 13 that can be replaced by the proposed invention.

The invention may be embodied in a battery casing as a fireproof and thermal insulating composite material panels forming the casing or attached to the casing. Advantages of a battery casing embodying the invention include that composite material panels need not significantly increase the size of a conventional battery casing while also providing thermal protection to areas of the aircraft near the battery. The invention may be deployed as a battery casing with panels that include the fireproof and thermal insulating composite materials that embody the invention. The battery casing embodying the invention may replacing conventional metal battery casing. In addition to suppression of fire penetration and thermal insulation, a battery casing with panels that embody the invention may reduce the weigh and reduce RC as compared to conventional metal battery casings.

Figure 7A:
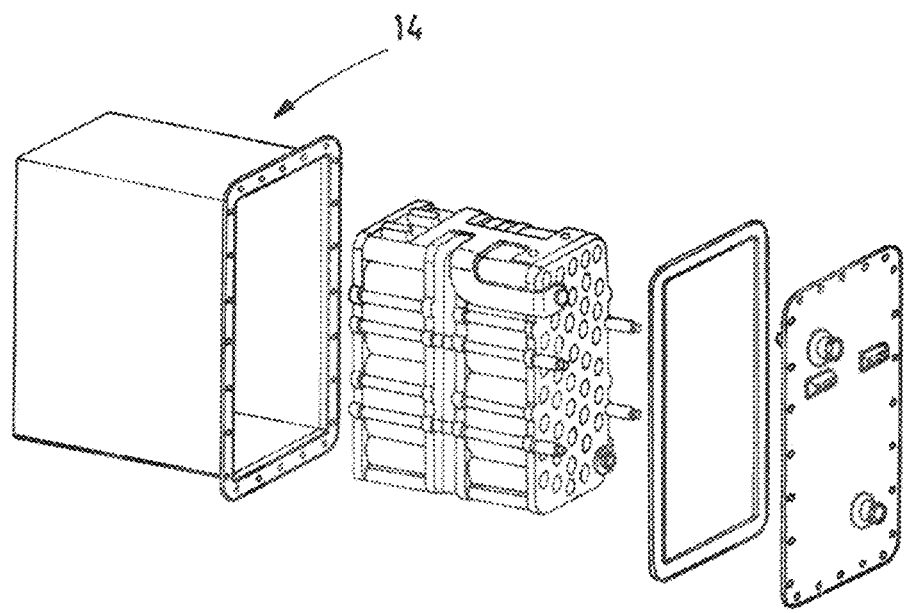
FIG. 7a shows an exploded view of a battery and the battery casing.
Figure 7B:
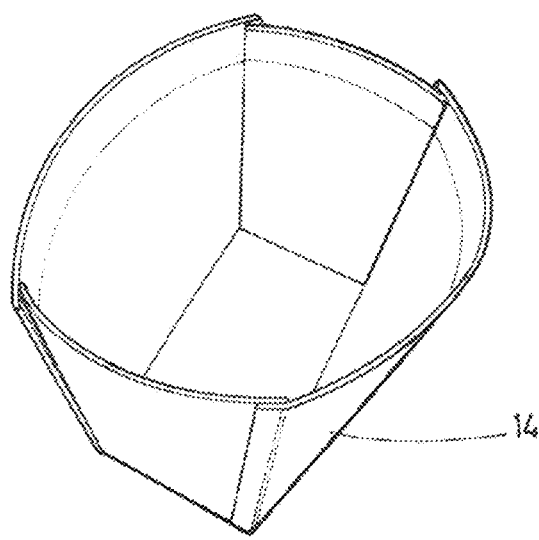
FIG. 7b shows a perspective view of a main element of the battery casing.

According to another aspect, the invention also refers to a battery casing 14 that comprises the fireproof and thermal insulator product 1,20 and 22. FIG. 7*a* shows an exploded view of a battery and its casing. FIG. 7*b* shows a perspective view of the main element of the casing.

The invention may be embodied as a duct formed of a fireproof and thermal insulator composite material. The duct may be metal duct protected by a layer of a fireproof insulator product 1, 20 and 22 on the interior and/or exterior of the duct. Composite fireproof duct: Sizing constraint: Thermal protection Modification: Replace current Titanium ducts by composite ones based in the proposed solution, preferably 3rd option. Benefits: Safety improvement, RC reduction.

According to another aspect, the invention also refers to a duct in an aircraft formed of the fireproof and thermal insulator composite laminate material or that used the fireproof and thermal insulator composite laminate material as a cover for an inside or outside surface of the duct.

The fireproof and thermal insulator composite laminate material may also be used to cover a portion of an engine deck in a helicopter or to form an engine housing in a helicopter. Using the fireproof and thermal insulator composite laminate material on an engine deck or in an engine housing is beneficial because the laminate material can be used in the often small spaces of a helicopter engine compartment and provide good thermal protection between the engine and the helicopter fuselage. The composite laminate may be used instead of conventional titanium skin and stringers typically used to form an engine deck or engine housing. The composite laminate may form outer layers between which are a carbon or glass fiber composite structural layer. By sandwiching a structural layer between the fireproof and thermal insulator laminate material a structural material is formed that can be used to in engine decks, engine housings, battery casings and in other structural components of an aircraft. The structural material may have a lower weight than conventional fireproof structural materials in an aircraft and that avoids differences in thermal expansion coefficients in materials used to form an engine deck, engine housing or battery casing.

Figure 8:
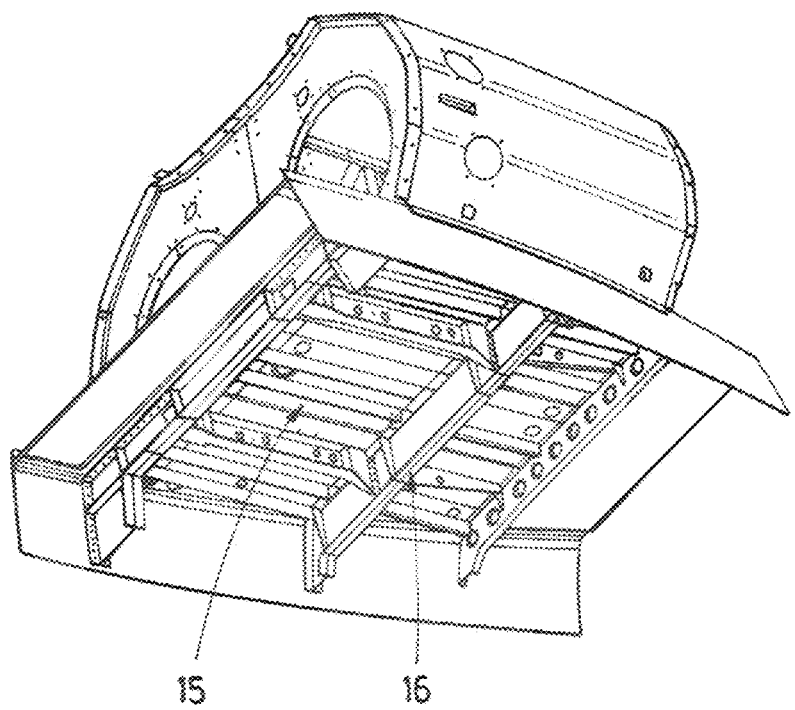
FIG. 8 shows an engine deck for a helicopter comprising a fireproof and thermal insulator embodiment of the invention.
Figure 9:
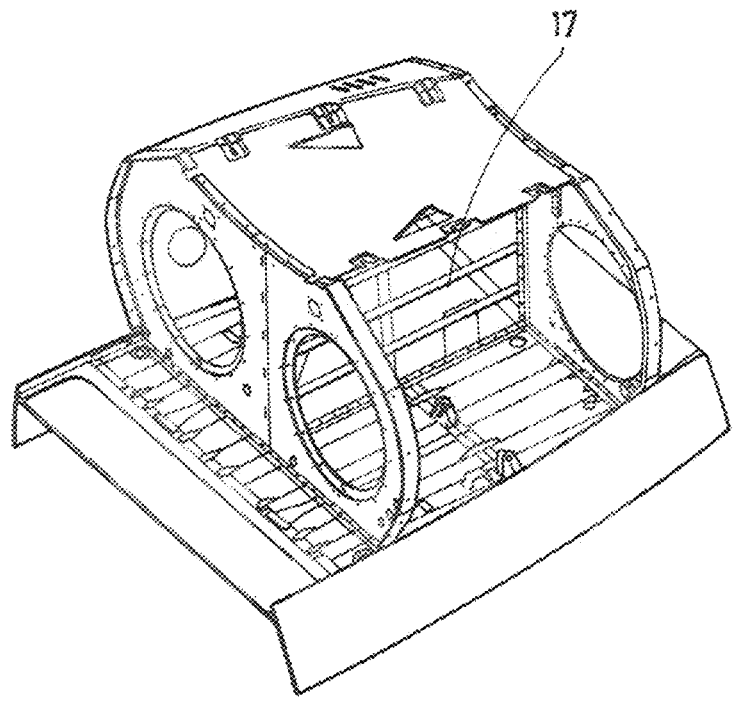
FIG. 9 shows a helicopter engine compartment having a central wall comprising the fireproof and thermal insulator product embodiment of the invention.

FIG. 8 shows an engine deck 15 including a titanium skin, stringers, clips and gussets, over a framework 16 usually made of aluminum. FIG. 9 shows a helicopter engine compartment having a central wall 17 comprising the fireproof and thermal insulator product 1, 20 and 22 that forms as a firewall or fire protection, e.g., central wall 17, over one or both helicopter engines, and/or in or on a helicopter engine deck 15. The central wall 17 or engine housing forms a firewall or fire container between the helicopter engines (not shown) and the fuselage of the helicopter. The central wall or housing may be formed or include layers of fireproof insulator product 1, 20 and 22 which embodies the invention. The product 1, 20 and 22 may be configured as a stiffened panel(s) such as products 1, 20 and 22 that form exterior or internal walls of the engine housing. The products 1, 20 and 22 are suited to forming a central firewall for helicopter engine(s) because they can be formed to provide a helicopter engine compartment central firewall; formed as stiffened panel for the central firewall, provide thermal protection to the fuselage and between the engines; may be used to replace conventional stiffened titanium skin central firewalls, and may need less maintenance and repair than conventional central firewalls.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fireproof and thermal insulator product comprising:
   alkaline earth silicate (AES) material arranged in an AES layer;
   a liquid barrier film;
   a fiber reinforcement plastic (FRP) layer;
   strips of cork extending from one edge of the AES layer to an opposite edge of the AES layer,
   wherein the liquid barrier film and the FRP layer are stacked on the AES material, and
   wherein the strips of cork are embedded into the AES material in the AES layer or the AES material is between the strips of cork in the AES layer.

2. The fireproof and thermal insulator product of claim 1, wherein the cork strips form a grid and the grid is infilled with the AES material.

3. The fireproof and thermal insulator product according to claim 1, wherein the liquid barrier film includes a thermoplastic film.

4. The fireproof and thermal insulator product according to claim 3, wherein the thermoplastic film is at least one of a Poly-Vinyl Fluoride (PVF) film, a PEEK film, a PDVF film, and a PET film.

5. The fireproof and thermal insulator product according to claim 1, wherein the FRP layer includes at least one of a Glass Fiber Reinforcement Plastic (GFRP) layer and a Carbon Fiber Reinforcement Plastic (CFRP) layer.

6. The fireproof and thermal insulator product according to claim 1, further comprising an adhesive layer between and bonding the liquid barrier film to the AES material.

7. A fireproof and thermal insulator laminate comprising:
   a layer of cork strips and an alkaline earth silicate (AES) material between the strips; and
   first and second fiber reinforcement plastic (FRP) layers,
   wherein the first FRP layer overlays a first side of the layer of cork strips and the AES material and the second FRP layer overlays a second side of the layer of cork strips and the AES material which is opposite to the first side,
   wherein the cork strips extend from an edge of the layer of cork strips and the AES material to an opposite edge of the layer of cork strips and the AES material.

8. The fireproof and thermal insulator laminate according to claim 7, wherein the cork strips are arranged in a grid and the regions of the AES material substantially fill openings in the grid.

9. The fireproof and thermal insulator laminate according to claim 7, further comprising a barrier film covering at least one surface of the first and/or second FRP layers.

10. The fireproof and thermal insulator laminate according to claim 7, further comprising fasteners extending through the laminate and configured to mount the laminate to a structure on an aircraft and wherein the laminate is separated by an air filled gap between the laminate and the structure.

11. The fireproof and thermal insulator laminate according to claim 7, wherein the fireproof and thermal insulator laminate is bonded or co-cured to a carbon fiber composite structure of an aircraft.

12. The fireproof and thermal insulator laminate according to claim 7, wherein the fireproof and thermal insulator laminate is included in a firewall between an auxiliary power unit and a fuselage of an aircraft.

13. The fireproof and thermal insulator laminate according to claim 7, wherein the fireproof and thermal insulator laminate forms a surface of a duct in an aircraft.

14. The fireproof and thermal insulator laminate according to claim 7, wherein the fireproof and thermal insulator laminate forms a battery casing.

15. The fireproof and thermal insulator laminate according to claim 7, wherein the laminate is a panel of an engine deck in a helicopter.

16. The fireproof and thermal insulator laminate according to claim 7, wherein the laminate is in a central firewall between an engine of a helicopter and the fuselage of the helicopter.

17. A fireproof and thermal insulator laminate comprising:
   a grid of cork strips, wherein the grid includes a first group of the cork strips extending in a first direction and a second group of the cork strips extending in a second direction, different from the first direction;
   alkaline earth silicate filling gaps between the cork strips in the grid, wherein the grid of cork strips and the alkaline earth silicate form a core layer; and
   first and second fiber reinforcement plastic (FRP) layers, wherein the core layer is sandwiched between the first and second FRP layers.

18. The fireproof and thermal insulator laminate of claim 17, further comprising a first barrier film covering an exposed surface of the first FRP layer and a second barrier film covering an exposed surface of the second FRP layer, wherein the first and second barrier films are impervious to liquids.

* * * * *